United States Patent

[11] 3,620,335

| [72] | Inventors | James R. Hendershot;<br>Robert F. Searle, both of Amherst, N.H. |
|---|---|---|
| [21] | Appl. No. | 8,472 |
| [22] | Filed | Feb. 4, 1970 |
| [45] | Patented | Nov. 16, 1971 |
| [73] | Assignee | Vibrac Corporation<br>Chelmsford, Mass. |

[54] MAGNETIC PARTICLE COUPLING
12 Claims, 1 Drawing Fig.

| [52] | U.S. Cl. | 192/21.5 |
|---|---|---|
| [51] | Int. Cl. | F16d 37/02 |
| [50] | Field of Search | 192/21.5 |

[56] References Cited
UNITED STATES PATENTS

| 2,614,668 | 10/1952 | Waderlow et al. | 192/21.5 |
|---|---|---|---|
| 2,903,109 | 9/1959 | Didszuns | 192/21.5 |
| 3,394,784 | 7/1968 | Searle | 192/21.5 |

Primary Examiner—Allan D. Herrmann
Attorney—Nicholas A. Pandiscio

ABSTRACT: A magnetic particle torque-transmitting device comprising means for providing face-sealing shaft seals such that the magnetic particles are substantially prevented from escaping from between the seals and the shaft.

PATENTED NOV 16 1971 3,620,335
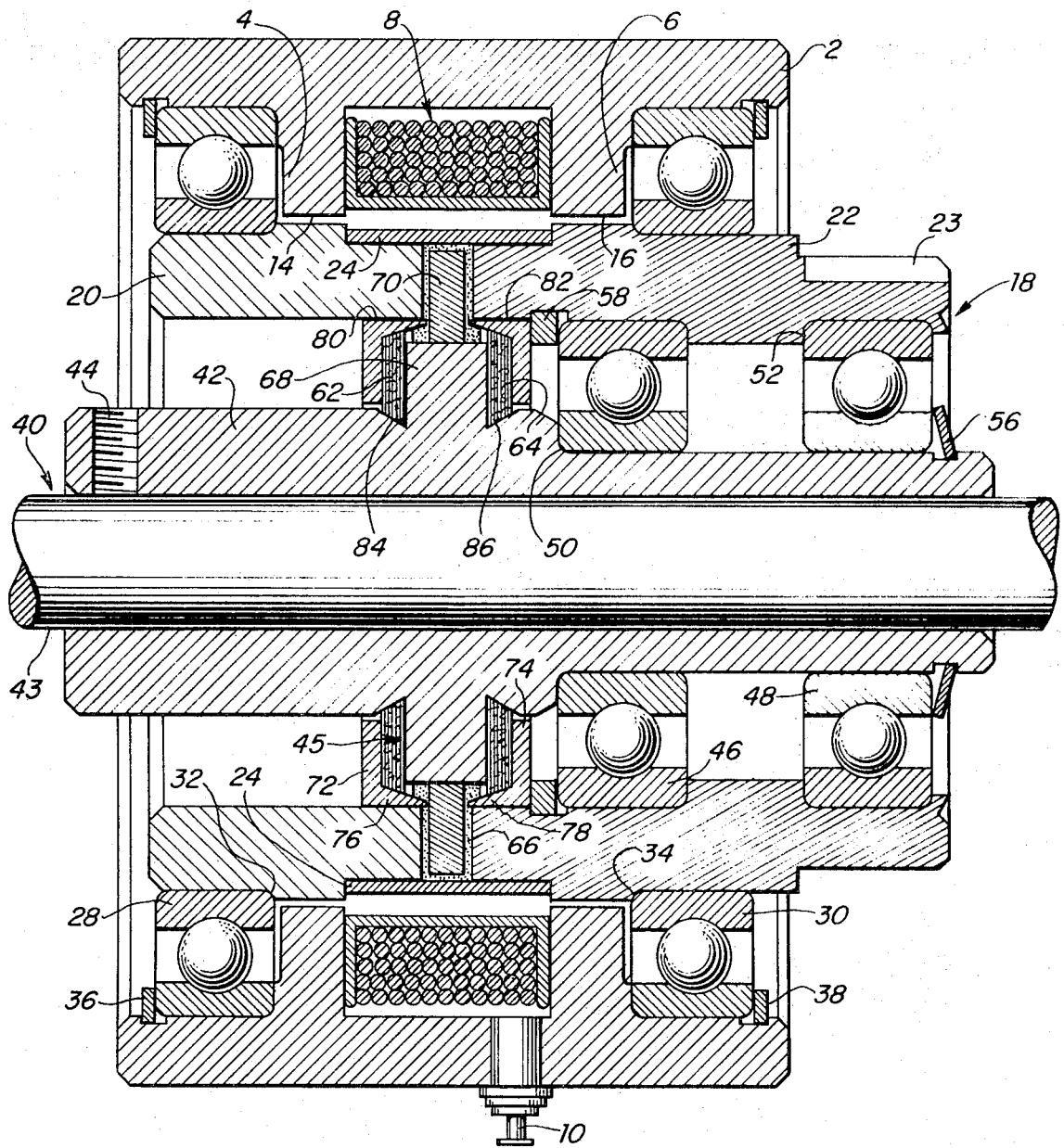
James R. Hendershot
Robert F. Searle
INVENTORS.
BY Schiller & Pandiscio
ATTORNEYS.

MAGNETIC PARTICLE COUPLING

This invention relates to magnetic torque-transmitting devices and more particularly to those devices employing magnetic particles for coupling together two relatively rotatably members.

Magnetic particle devices for various types are known to the art. Most commonly they are constructed to function as quick-acting electrically actuated clutches or brakes, but they also can be designed to impart drag to rotatable member as, for example, where it is desired to maintain tension. Such devices offer many advantages, including fast response, adjustability of output torque over a relatively wide range, smooth chatter-free operation and ability to operate in the slip condition. The present invention is concerned with an improvement that greatly improves the reliability and service life of magnetic particle torque-transmitting devices. The reliability and operating life of magnetic particle devices depends on the ability to retain the magnetic particles in the area where they are effective to transmit torque. Typically devices of the type to which the invention relates consist of an armature assembly comprising two spaced pole pieces or armature members, a shaft disposed within the armature assembly and carrying a disc that extends into the space between the two pole pieces, bearing means supporting the shaft for rotation relative to the armature assembly, magnetic particles disposed between the disc and the pole pieces, and means for providing a magnetic field across the armature assembly and the disc so that the magnetic particles will lock into torque-transmitting chains coupling the disc and the pole pieces. Where the device is designed to function as a clutch, the armature assembly constitutes part of a rotor assembly that is mounted for rotation relative to a surrounding housing and functions as an input or driving member while the rotatable shaft on which the disc is mounted functions as an output or driven member, Where the device is designed to operate as a brake, the armature assembly is locked against movement relative to the housing and the applied magnetic field operates to oppose rotation of the disc relative to the armature assembly. In both cases shaft seals are required between the shaft and the two pole pieces to confine the magnetic particles to the spaces between the disc and the pole pieces. Extensive research and development has yielded a variety of high-performance shaft seals. However, it has been determined that the magnetic particles have a tendency to migrate into and become entrapped in the seals, and once entrapped they act as an abrasive to accelerate seal wear and eventually enough particles escape thereby destroying the operativeness of the device.

Accordingly, the primary object of this invention is to extend the useful life of magnetic devices of the type described above by an improvement that minimizes shaft seal wear and minimizes the escape of magnetic particles.

Another object is to provide an improvement over magnetic particle devices of the type illustrated in U.S. Pat. No. 3,394,784.

A further object is to provide improved magnetic torque-transmitting devices of the character described wherein the shaft seals have a service life equivalent to bearing life.

We have discovered that the operative life of the device can be greatly increased if the shaft seals are provided as radial face seals having a long circuitous contact path with the shaft so that the magnetic particles are confined to an area where they are effective to transmit torque between the armature assembly and the disc.

Therefore, a more specific object of the invention is to provide in a magnetic particle torque-transmitting device of the character described means for providing radial face-sealing shaft seals so that the magnetic particles are substantially prevented from escaping from between the seals and the shaft.

The foregoing and other objects are attained by providing a cylindrical hollow shaft surrounding but snugly engaging the output shaft for coextensive rotation therewith. The hollow shaft has a radially extending disc intermediate its ends. The disc extends between the two armature members and comprises an inner nonmagnetic ring formed integrally with the hollow shaft and an outer magnetic ring concentric with the inner ring. The magnetic particles are disposed in the space between the outer ring and armature members. The shaft seals are positioned between the armature members and the hollow shaft and are arranged so that one face of each seal engages the corresponding face of the inner ring and the inner end of each seal fits in a groove in the shaft adjacent the inner ring. In this position, the seals provide a very long circuitous contact path so that the magnetic particles are substantially prevented from escaping from the working area between the armature members and the outer ring of the disc.

Other objects and many of the attendant advantages of this invention are believed to be apparent from the following specification which is to be considered together with the accompanying drawings wherein:

The FIGURE is a longitudinal sectional view of a magnetic particle clutch constituting a preferred embodiment of the present invention.

Turning now to the FIGURE, there is illustrated a magnetic particle clutch comprising a stationary field coil and rotatable input and output rotor assemblies mounted in a cylindrical housing 2. The field coil, secured between two inner radial projections 4 and 6 of housing 2 is an annular coil assembly 8 of known construction. The opposite ends of the coil are connected to a pair of suitable terminals mounted in the housing 2, one of such terminals being shown at 10. These terminals are used to couple the coil to an external power source (not shown) whereby it is energized. The housing 2 and its projections 4 and 6 are made of magnetic material, with the inner axially extending faces 14 and 16 of projections 4 and 6 respectively functioning as poles to develop a magnetic field through adjacent portions of the input rotor assembly which is identified generally by numeral 18.

The input rotor assembly comprises two driving members 20 and 22 that are formed of magnetic material so as to function as armatures. Driving member 22 partially projects outside of housing 2 and has a keyway 23 formed on the outer surface thereof on the portion of member 22 which projects outside of housing 2. Keyway 23 allows the input rotor assembly 18 to be coupled to a source of torque input. The driving members 20 and 22 are connected to each other by a sleeve 24 made of nonmagnetic material. Sleeve 24 may be press-fitted onto the driving members 20 and 22 or may be secured thereto by other means, as for example, by means of screws (not shown). The two driving members 20 and 22 are rotatably supported inside the housing 2 by means of bearings 28 and 30, the positions of which are determined by shoulders 32 and 34 that are formed in the two driving members 20 and 22 respectively and engage the inner races of the bearings, and by retainer rings 36 and 38 that snap into grooves formed on the inside surface of housing 2 and engage the outer races of the bearings, The bearing 28 is biased against the shoulder 32 by the retainer ring 36 and the bearing 30 is biased against the shoulder 34 by the retainer ring 38.

The two driving members 20 and 22 functions as a bearing support for an output rotor assembly identified generally by numeral 40. The output rotor assembly comprises an output or rotor shaft 42 which is constructed of nonmagnetic material and is hollow so as to accommodate a shaft 43 whereby it is coupled to some other mechanism. It is to be understood that shaft 43 may be part of the mechanism or device with which the clutch is to be coupled or may be an auxiliary member used to couple the clutch to such mechanism or device. The output shaft 42 is provided with one or more set screws 44 or other suitable means for locking it to shaft 43 so that both shafts rotate as a unit. The output rotor assembly also comprises a disc shown generally at 45. Further details of the construction of disc 45 are set forth hereinafter. The shaft 42 is rotatably supported by the input rotor assembly by means of bearings 46 and 48, the positions of which are defined by shoulder 50 on the shaft 42 and by shoulder 52 on the driving member 22 respectively and by a retainer ring 56 that snaps into a groove formed in shaft 42. A spacer ring 58 also is mounted in a groove 58 in driving member 22 against the outer race of bearing 46. Disc 45 extends between the adjacent driving members 20 and 22.

The disc 45 consists of two concentric rings of different thicknesses. Inner ring 68 comprises a radially extending flange formed integral with shaft 42. Hence, it also is made of nonmagnetic material. Outer ring 70, which has a thickness or dimension in the direction parallel to the axis of shaft 42 less than the thickness in the same direction of inner ring or projection 68, is made of a magnetic material such as No. 2 relay steel. The outer diameter of the outer ring 70 is slightly less that the inner diameter of sleeve 24 so as to provide a gap therebetween, The outer ring 70 may be attached to the inner ring or projection 68 of shaft 42 in a variety of ways, as for example, by press fitting or inductive soldering.

Shaft 42 is reduced in diameter adjacent the opposite aides of its ring 68 so as to provide tow circumferential grooves 84 and 86 that serve as seats for the face seals hereinafter described. Grooves 84 and 86 are each defined by the adjacent side of ring 68 and a sloping surface that meets the ring at an acute angle.

Adjacent and in abutting relationship with inner ring 68 are face seals 62 and 64. Seals 62 and 64 are secured to and housed in circular rings 72 and 74 which have a generally L-shaped cross section so as to provide projecting edges 76 and 78 that surround and engage the outer ends of seals 62 and 64 respectively. The edges 76 and 78 project into the spaces surrounding the disc beyond the edges of the driving members 20 and 22. The rings 72 and 74 are made of nonmagnetic material such as brass and the seals 62 and 64 housed therein are made of s suitable resilient sealing material such as rubber or plastic impregnated felt. The outer surfaces 80 and 82 of edges 76 and 78 are press fitted against the inside surface of driving members 20 and 22 respectively. The outer diameter of rings 72 and 74 is slightly greater than the outer diameter of the inner ring 68, and the edges 76 and 78 extend axially of shaft 42 to just short of engagement with magnetic ring 70. The ends of face seals 62 and 64 adjacent the projecting edges 76 and 78 of rings 72 and 74 together with said edges and the ends of driving members 20 and 22 adjacent the outer ring 70 and sleeve 24 function to close off the annular space between disc 45 and the two driving members 20 and 22. This space is filled with dry magnetic particles 66.

Face seals 62 and 64 are annular members which before insertion in the clutch are of substantially rectangular cross section when viewed in section as in the FIGURE. When mounted in the clutch, their side surfaces engage the side faces of inner ring 68 tight enough to form a firm seal therewith and yet permit rotation of shaft 42 and disc 45. Additionally, with respect to their inner diameters, the seals are sized so that they can seat in grooves 84 and 86 and, when so seated, are radially compressed so that they are no longer rectangular but rather trapezoidal in cross section and make firm engagement with shaft 42.

As is evident from the drawing, the engagement of face seals 62 and 64 along the entire side faces of the inner ring 68 and along the sloping surfaces of the grooves 84 and 86 is long an circuitous. Since the face seals determine that the path which must be followed by the magnetic particles in order to escape from the annular space around the prevented ring 70 is long and circuitous, they are effectively prevented from escaping, with the result that the life of the device is greatly increased. In addition, the relatively large spacing between the seals 62 and 64 and that portion of outer ring 70 which is immediately adjacent to the inner ring 68, helps to substantially reduce the number of particles 66 which could become entrapped between the seals and the side faces of the inner ring 68. This feature of the present invention also helps to substantially reduce the wearing of seals 62 and 64.

Operation of the above-described clutch will now be described. When the coil 8 is energized, a magnetic filed is established across the particles 66 through the highly permeable housing 2 and its projections 4 and 6, the driving armature members 20 and 22 and the driven disc 45. With such flux linkage across the magnetic particles, the latter will lock in chains between driving members 20 and 22 and disc 45, thereby coupling the input rotor assembly 18 with the output rotor assembly 40. The transmitted torque is controllable by varying the strength of the magnetic field. The clutch may be operated at any desired torque level or between any two or more torque levels by selection of appropriate energizing currents. Generally, the energized clutch is operated such that the input rotor assembly 18 rotates faster that the output rotor assembly 40. This is known as operating in the slip condition and involves shearing of the magnetic bonds within the powder. The degree of slip varies inversely with the degree of magnetizing force and is also a function of the load on the output rotor assembly. Such a clutch is characterized by extremely fast response with the response time being substantially independent of the direction of rotation of the input rotor assembly.

The significance of the two-piece construction of disc 45 and the operative relationship to face seals 62 and 64 will now be described. In this connection, it is to be noted that the basic concept of using a two-piece disc is disclosed in U.S. Pat. No. 3,394,784 and that this invention improves thereon by using face seals and a two-ring disc in which one 200 is substantially thinner than the other. After the clutch has been assembled but before it is operated, the particles 66 are more or less uniformly distributed on both sides of disc 45. When the clutch coil is energized, the particles will be attracted by the resulting magnetic field. Since the inner ring 68 of the disc 45 is nonmagnetic, the flux through the disc will tend to be confined to the outer magnetic ring 70. In other words, the flux density between disc 45 and driving members 20 and 22 will be relatively high in the region of ring 70 and quite small in the region if ring 68. Hence, the magnetic field will urge particles 66 outwardly away from shaft 43 so that the concentration of particles will be greatest between driving members 20 and 22 and the outer ring 70 of disc 45. Since ring 70 is larger in diameter than seals 62 and 64 and additional spacing is provided between the seals 62 an 64 and the portion of the outer ring 70 immediately adjacent inner ring 68, the effect of concentrating the particles in the region of the ring 70 and the said additional spacing is to diminish the concentration of particles in contact with and in the immediate vicinity of shaft 42 and seals 62 and 64. Thus, during operation of the clutch, the likelihood of particles migrating in between shaft 42 and its face seals 62 and 64 is greatly reduced, with a consequent improvement in seal and clutch life. Those particles which are able to migrate between the face seals 62 and 64 and the side faces of inner ring 68 are substantially prevented from escaping because of the long and circuitous path defined by the positioning of the face seals along the entire side faces of inner ring 68 and against the sloping surfaces of grooves 84 and 86.

While the benefits of this invention are particularly apparent in installations where the clutch is continuously energized or is operated for long periods in the slip condition, they also are present where the clutch is operated intermittently. In this connection, it is to be noted that when the clutch is deenergized, the driving members 20 and 22 will have a small residual magnetism that tends to maintain the particles in alignment with the outer ring 70 of disc 45. The same improvement in useful life occurs if the two piece disc is used in a magnetic particle brake, even though in a brake the seals and the two armature members confronting the disc are locked against rotation relative to the housing.

The significant improvement in useful life resulting from use of face seals in combination with the two-piece disc 44 has been confirmed by comparison life tests.

Although it is shown as being hollow, it is to be understood that shaft 42 may be a solid shaft. However, the construction shown in the drawing is preferred since it is more versatile in its use.

It is to be appreciated that the present invention provides a marked improvement in shaft seal life and in the operating life of the entire magnetic particle device, and that this improvement results regardless of whether the device is a clutch or brake. In this connection, it is to be noted that the clutch construction illustrated in the drawings may be converted to a brake by locking the armature members against rotation relative to the housing, in which case the magnetic field produced by energizing coil 8 will operate to brake rotation of shaft 42. In the usual brake construction the bearings 28 and 30 are omitted and the armature members 20 and 22 are made integral with housing and its projections 4 and 6.

It is to be understood that the invention is not limited in its application to the details of construction and arrangement of parts specifically described or illustrated, and that within the scope of the appended claims, it may be practiced otherwise than as specifically described or illustrated.

We claim:

1. A magnetic particle comprising a shaft with a radially extending disc intermediate the ends thereof, said disc comprising inner and outer rings each having opposite side faces with the inner ring formed of nonmagnetic material and the outer ring formed of magnetic material, an assembly comprising (a) first and second magnetic armature members disposed on opposite sides of said disc in axial spaced relation thereto and (b) nonmagnetic means extending between and secured to said armature members in radial spaced relation to said disc, magnetic particles positioned in the spaced between said disc and said armature members, means rotatably supporting said shaft in said assembly, radially extending sealing members interposed between said shaft and said assembly on opposite sides of said disc for preventing escape of said particles from said spaces, said outer ring having a greater diameter than said sealing members, said sealing members abutting substantially the entire side faces of said inner ring, and means for establishing a magnetic field through said disc and said armature members to magnetize said particles so as to transform then into a torque transmitting coupling between said disc and said armature members, with said disc constraining said field so that said particles are attracted away from said sealing members and said shaft.

2. A magnetic device as defined by claim 1 wherein said means for establishing said magnetic field includes a coil and said assembly is rotatable with respect to said coil.

3. A magnetic particle device according to claim 1 wherein said inner disc is thicker than said outer disc.

4. A magnetic particle device according to claim 3 wherein said sealing members extend radially of said shaft beyond said inner ring.

5. A magnetic particle device according to claim 1 wherein said sealing members each comprise (1) an annular seal made of resilient material in engagement with a side face of said inner ring and (2) a support to which said seal is attached having an annular section spaced from said shaft and a cylindrical section that is integral with said annular section and is secured to one of said armature members.

6. A magnetic device according to claim 5 wherein the said cylindrical section of the seal support of each sealing member is aligned with and terminates immediately short of said outer ring.

7. A magnetic particles comprising a shaft with a radially extending disc intermediate the ends thereof and circumferential grooves on opposites sides of said disc, said disc comprising inner and outer rings having opposite side faces, with the inner ring formed of nonmagnetic material and the outer ring formed of magnetic material, an assembly comprising (a) first and second magnetic armature members disposed on opposite sides of said disc in axial spaced relation thereto and (b) nonmagnetic means extending between and secured to said armature members in radial spaced relation to said disc, magnetic particles positioned in the spaces between said disc and said armature members, means rotatably supporting said shaft in said assembly, radially extending sealing members interposed between said shaft and said assembly on opposite sides of said disc for preventing escape of said particles from said spaces, said sealing members extending into said grooves and abutting substantially the entire side faces of said inner ring, and means for establishing a magnetic field through said disc and said armature members to magnetize said particles so as to transform them into a torque-transmitting coupling between said disc and said armature members, said disc adapted to constrain said field so that said particles are attracted away from said sealing members and said shaft.

8. A magnetic device as defined in claim 7 wherein each of said grooves is defined by one side face of said inner ring and a sloping surface which extends below the outer surface of said shaft until it intersects said side face, said sealing means abutting both said side faces of said inner ring and said sloping surfaces of said grooves.

9. A magnetic particle device comprising a housing, an assembly within said housing comprising first and second axially spaced magnetic armature members, a shaft rotatably supported within said assembly, a disc affixed to said shaft and extending radially between said armature members, said disc comprising an inner nonmagnetic ring and an outer magnetic ring, a pair of circumferential grooves in said shaft on opposite sides of said disc, each of said grooves being defined by one face of said inner ring and a sloping surface on said shaft that intersects said one face, said assembly further including nonmagnetic means connecting said armature members and disposed in radially spaced surrounding relation to said disc, magnetic particles positioned in the spaced between said disc and said armature members, a pair of resilient seals between said shaft and said assembly on opposite sides of said disc, said seals abutting the opposite side faces of the inner ring of said disc and also the said sloping surfaces on said shaft so as to provide a relatively long, circuitous impedance to the escape of said particles from said spaces, and means for establishing a magnetic field across said disc and said armature members to lock said particles in a magnetic torque-transmitting relation with said disc and said armature members, the inner and outer rings of said disc coacting to constrain said field so that said particles are attracted away from said seals and said shaft.

10. A magnetic device as defined by claim 9 wherein said outer ring has a greater diameter than said sealing means.

11. A magnetic device as defined in claim 9 wherein said assembly is mounted for rotation within said housing.

12. A magnetic device as defined by claim 9 wherein at least one end of said shaft and at least one end of said assembly project from said housing and are adapted for coupling to an output load and source of torque input.

* * * * *

UNITED STATES PATENT OFFICE
CERTIFICATE OF CORRECTION

Patent No. __3,620,335__   Dated __November 16, 1971__

Inventor(s) __James R. Hendershot & Robert F. Searle__

It is certified that error appears in the above-identified patent and that said Letters Patent are hereby corrected as shown below:

Claim 1, Column 5, Line 28, the word "spaced" is changed to "space";

Claim 1, Column 5, Line 37, the word "then" is changed to "them";

Claim 7, Column 5, Line 61, delete "particles" and insert "particle device";

Claim 7, Column 6, Line 3, before "having" insert "each"; and

Claim 9, Column 6, Line 41, the word "spaced" should be "space".

Signed and sealed this 30th day of May 1972.

(SEAL)
Attest:

EDWARD M. FLETCHER, JR.
Attesting Officer

ROBERT GOTTSCHALK
Commissioner of Patents